(12) United States Patent
Gopalakrishnan et al.

(10) Patent No.: US 7,843,867 B2
(45) Date of Patent: Nov. 30, 2010

(54) COLLABORATIVE COMMUNICATION FOR WIRELESS LOCAL AREA NETWORKS

(75) Inventors: Praveen Gopalakrishnan, Somerville, NJ (US); David Famolari, Stewartsville, NJ (US); Toshikazu Kodama, Morristown, NJ (US); Kamesh Medepalli, Sunnyvale, CA (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 619 days.

(21) Appl. No.: 11/347,827

(22) Filed: Feb. 3, 2006

(65) Prior Publication Data

US 2007/0060157 A1 Mar. 15, 2007

Related U.S. Application Data

(60) Provisional application No. 60/649,761, filed on Feb. 4, 2005.

(51) Int. Cl.
*H04B 7/14* (2006.01)

(52) U.S. Cl. .................. 370/315; 370/328; 370/338; 455/11.1

(58) Field of Classification Search .............. 370/315, 370/328, 338; 455/11.1, 7, 500
See application file for complete search history.

(56) References Cited

U.S. PATENT DOCUMENTS

| | | | |
|---|---|---|---|
| 2002/0187746 A1* | 12/2002 | Cheng et al. ............ | 455/11.1 |
| 2003/0176200 A1* | 9/2003 | Harrison ................ | 455/500 |
| 2004/0005861 A1* | 1/2004 | Tauchi .................. | 455/11.1 |
| 2004/0097190 A1* | 5/2004 | Durrant et al. .......... | 455/7 |
| 2004/0101037 A1* | 5/2004 | Meng ................... | 375/220 |
| 2005/0094588 A1* | 5/2005 | Wentink ................ | 370/315 |

* cited by examiner

*Primary Examiner*—Danh C Le
(74) *Attorney, Agent, or Firm*—Watchstone P&D, PLLC

(57) ABSTRACT

A helper station system is disclosed that can enhance communications in a wireless network having at least one slow or unreliable link. In preferred embodiments, the helper station system includes at least one helper station configured to wirelessly re-transmit an original wireless transmission from at least one sender station to at least one access point without having to re-contend for access to the wireless medium.

19 Claims, 7 Drawing Sheets

COLLABORATIVE COMMUNICATION FOR WIRELESS LOCAL AREA NETWORKS

The present application claims priority under 35 U.S.C. 119 to U.S. Provisional Application Ser. No. 60/649,761 filed on Feb. 4, 2005, entitled Helper Station Systems and Methods, the entire disclosure of which is incorporated herein by reference.

BACKGROUND

1. Field of the Invention

The present application relates to wireless networking and, in some preferred embodiments, to methods of improving wireless communications, such as, e.g., for enhanced throughput, for reduced delays, for enhanced range (e.g., distance) of wireless communications and/or the like.

2. General Background Discussion:

Networks and Internet Protocol

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identifier.

IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. In the OSI and other similar models, IP is in Layer-3, the network layer. The layers of the OSI model are listed below.

Layer 7 (i.e., the application layer) is a layer at which, e.g., communication partners are identified, quality of service is identified, user authentication and privacy are considered, constraints on data syntax are identified, etc.

Layer 6 (i.e., the presentation layer) is a layer that, e.g., converts incoming and outgoing data from one presentation format to another, etc.

Layer 5 (i.e., the session layer) is a layer that, e.g., sets up, coordinates, and terminates conversations, exchanges and dialogs between the applications, etc.

Layer-4 (i.e., the transport layer) is a layer that, e.g., manages end-to-end control and error-checking, etc.

Layer-3 (i.e., the network layer) is a layer that, e.g., handles routing and forwarding, etc.

Layer-2 (i.e., the data-link layer) is a layer that, e.g., provides synchronization for the physical level, does bit-stuffing and furnishes transmission protocol knowledge and management, etc. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer and interprets commands and performs error recovery.

Layer 1 (i.e., the physical layer) is a layer that, e.g., conveys the bit stream through the network at the physical level. The IEEE sub-divides the physical layer into the PLCP (Physical Layer Convergence Procedure) sub-layer and the PMD (Physical Medium Dependent) sub-layer.

Typically, layers higher than layer-2 (such as, e.g., layers including the network layer or layer-3 in the OSI model and the like) are referred to as the higher-layers.

Wireless Networks

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (i.e. outside mobile IP), typically, routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

Some Limitations of Existing Wireless Systems

This section sets forth certain knowledge of the present inventors, and does not necessarily represent knowledge in the art.

One of the inherent features of a broadcast medium like wireless is that, generally speaking, all stations can listen to all packets, as long as they are within the wireless transmission (e.g., radio) range.

In such wireless communications, when a receiver within the network receives a wireless transmission (e.g., one or more packet), the receiver decodes the destination MAC address identified in the transmission. If the destination address does not match it's own MAC address, the receiver drops the packet without further processing. In this manner, the receiver makes no further use of packets that are not intended for itself.

Generally speaking, in such wireless communications, there can in many circumstances be one or more low speed and/or unreliable communication link(s) (such as, e.g., between a mobile node or other wireless device and an access point), which links can result in, among other problems, 1) low throughput, 2) delays caused by local/temporal interferers, and/or 3) range limitation.

Existing WLAN systems typically have an access point (AP) and a number of stations that are distributed across the radio range of the AP. Due to this spatial distribution of the stations, each station will experience a different link quality to and/or from the AP. If the transmission power and the rate were kept constant, this would translate directly into different link error probabilities. However, most WLAN stations are equipped with auto-rate adjustment techniques which are designed to keep the link error rate within a certain range (e.g., by varying the transmit rate). By way of example, 802.11b systems may be configured to switch between 11 Mbps, 5.5 Mbps, 2 Mbps and 1 Mbps while keeping the link error rate within generally 10%. This rate-adaptation is advantageous because if link error rates (e.g., packet error rates) are allowed to go beyond 10-20%, there is typically found to be noticeable degradation in perceived performance.

Generally speaking, low-rate stations have higher impact on net throughput than high-rate stations. Thus, the net throughput of a wireless system can be, e.g., determined by the lowest rate user. If it is assumed that in a WLAN system stations are distributed uniformly across a circular area covering the radio range, then more stations will select low rates, since the number of stations will increase as one moves farther from the center. In brief, the presence of stations that are displaced further away from the AP (and, e.g., potentially having low-rates affecting net system throughput) is unavoidable.

The present inventors have surmised that using more transmit power to compensate for losses (e.g., due to distance) and, thus, increase the rate is not a very practical solution in WLANs due to, inter alia, the transmit power restrictions in place (such as, e.g., in un-licensed 5 GHz band). In addition, in many cases, stations are mobile devices having battery-life constraints, such that using more transmit power is also counterproductive in this respect.

The present inventors have determined that another aspect to be considered in future WLAN systems (such as, e.g., due to the rapid increase in the number and types of devices operating in WLAN bands) is the presence of interferers (such as, e.g., dynamic and/or local interferers). In this regard, in some instances, a good link (e.g., error free or substantially error free) between a station and an AP can become un-reliable for a short period of time due to the presence of, e.g., one or more local interferer. However, due to the local nature of interference, the AP may be able to receive packets successfully from another station, such as, e.g., another mobile device or another link. As an example, if a second station is much nearer to an AP than a first station, it may have a higher received signal power at the AP (e.g., which may be able to withstand the interference).

The present inventors have identified that in an infrastructure WLAN system, a station can essentially address its packets only to the AP. The inventors have further identified that in such an common system, re-routing in the sense of MAC and higher layers is not applicable, and that re-routing in this case needs the presence of multiple physical links (though they may be, e.g., multi-hop)

The present inventors have also identified that range limitations of WLANs, especially such in higher-frequency band (802.11a, 802.11n), is a matter of serious concern. In a typical usage scenarios (such as, by way of example, a multi-floor home, residence or business), where it is difficult for a single AP to reach all areas, there is an unrealized need for smart techniques to extend the wireless reach.

The present inventors have identified that the mere use of 'repeaters' which receive the packet and then re-transmit the same creates an undesirable solution. Here, a 'repeater' commonly behaves just like another station (e.g., from a MAC layer perspective). Accordingly, repeaters would, thus, increase the medium contention.

While a variety of systems and methods are known, there remains a need for improved systems and methods which overcome one or more of the following and/or other limitations caused by, e.g., the presence of poor links (such as, e.g., low speed and/or unreliable links): 1) low throughput; 2) delays caused interferers (such as, e.g., by local and/or temporal interferers); and/or 3) range limitation.

SUMMARY OF THE PREFERRED EMBODIMENTS

The preferred embodiments of the present invention can significantly improve upon existing methods and/or apparatuses.

Among other things, some embodiments of the present invention make use of a "wireless broadcast advantage" in a way that helps the stations experiencing a slow or unreliable link to relay their packets using better (e.g., faster and/or more reliable) links.

Among other things, some embodiments of the present invention can help to a) reduce the number of low-rate users in a system and/or to b) assist in delivering the packets of low-rate users in a faster manner.

Among other things, some embodiments of the present invention can help to overcome interference issues by, e.g., re-routing packets from an un-reliable link to a more reliable link, without having to wait for the interference to subside. In some embodiments, the system can provide a form of "link-diversity", where a packet can be routed through one of several links available (such as, e.g., based on temporal characteristics of the links).

According to some embodiments, a helper station system for enhancing communications in a wireless network having at least one slow or unreliable link, is provided that includes: at least one helper station configured to wirelessly re-transmit an original wireless transmission from at least one sender station to at least one access point without having to re-contend for access to the wireless medium. In some embodiments, the at least one helper station is configured to re-transmit the transmission within a same packet cycle of the original transmission. In some embodiments, the at least one helper station is configured to re-transmit the original transmission at a faster rate than the at least one sender station. In some embodiments, the at least one sender station is configured to become aware of the presence of the at least one helper station and to increase its transmission rate based on such awareness. In some embodiments, the at least one helper station is configured to determine if the original transmission received from the at least one sender station requires help. In some embodiments, the at least one helper station is configured to effect re-transmission in the absence of an acknowledgement signal from the access point within a certain time period. In some embodiments, the at least one helper station is configured to process received packets of the original transmission, irrespective of whether destination addresses of the received packets match its own MAC address. In some embodiments, the at least one helper station is configured to ignore a duration field in received packets of the original transmission and to not update a NAV vector.

In addition, in some embodiments, the at least one helper station is configured to determine if the access point has not received the original transmission, and is configured such that if the helper station determines that the access point has received the original transmission, the helper station drops the original transmission, and such that if the helper station determines that the access point has not received the original transmission, the helper station re-transmits the original transmission to the access point. In some embodiments, the helper station is configured such that if the helper station determines that the access point has not received the original transmission, the helper station re-transmits the original transmission to the access point after the helper station decodes the original transmission. In some embodiments, the helper station is configured such that if the helper station determines that the access point has not received the original transmission, the helper station re-transmits the original transmission while maintaining the MAC address the same as that of the original transmission.

According to other embodiments of the invention, a method for enhancing communications in a wireless network having at least one slow or unreliable link is performed that includes: a) transmitting an original transmission from at least one sender station to at least one access point at a first transmission rate; and b) receiving the original transmission at at least one helper station configured to re-transmit the first transmission to the access point at a second transmission rate that is substantially faster than the first transmission rate without having to re-contend for access over the wireless medium. In some embodiments, the method further includes causing the sender station to be aware of the presence of the at least one helper station and increasing the sender station's transmission rate based on such awareness. In some embodiments, the method further includes having the helper station determine if the original transmission received from the at least one sender station requires help. In some embodiments, the method further includes having the helper station effect re-transmission in the absence of an acknowledgement signal from the access point within a certain time period. In some embodiments, the method further includes having the at least one helper station determine if the access point has not received the original transmission, and if the helper station determines that the access point has received the original transmission, having the helper station drop the transmission, and if the helper station determines that the access point has not received the original transmission, having the helper station re-transmit the original transmission to the access point.

According to other embodiments of the invention, a system for enhancing communications in a wireless network having at least one slow or unreliable link is provided that includes: a sender station configured to send a transmission to an access point on a wireless network; the sender station being configured to be aware of the presence of a helper station that is configured to re-transmit an original transmission from the sender station to at least one access point without having to contend for access over a wireless medium; and the sender station being configured to increase its rate of transmission to the access point based on being aware of the presence of the helper station and in reliance on the helper station. In some embodiments, the system further includes at least one helper station that is configured to re-transmit the original transmission without having to re-contend for access to the wireless medium.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which.

DETAILED DESCRIPTION OF THE PREFERRED EMBODIMENTS

Figure 1:
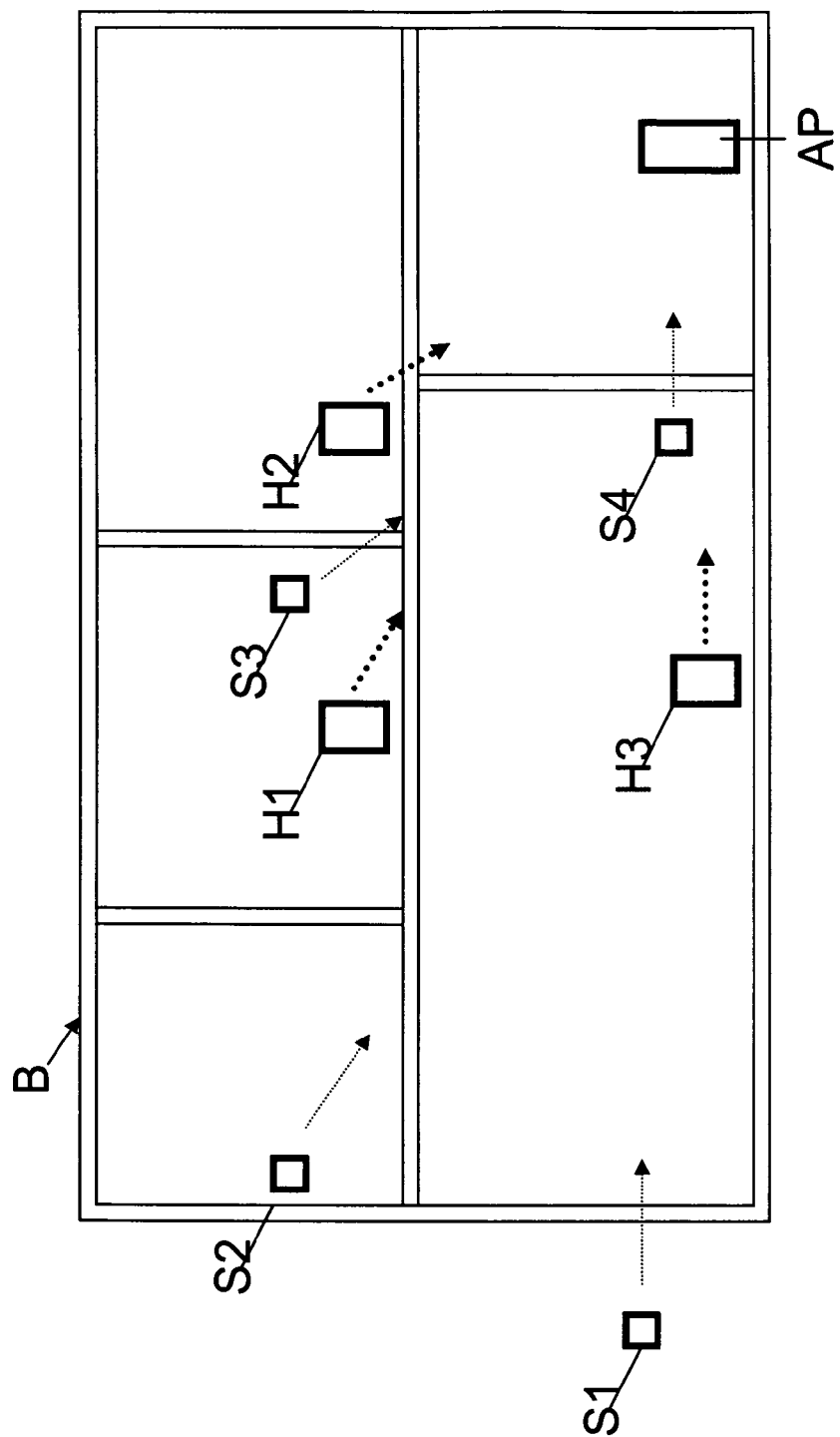
FIG. 1 is an architectural diagram depicting an illustrative wireless communication system within a building structure according to some illustrative and non-limiting embodiments.

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

Introduction to the Preferred Embodiments

The dynamic and/or mobile nature of WLAN systems and the like can result in some stations (such as, e.g., personal computers, lap top computers, personal digital assistants (PDAs), routers, and various other devices, transceivers, and/or the like) experiencing poor link quality, making transmission rates low and/or packet error rates high. This type of behavior—even by just a few stations—can have system-wide effects, reducing the overall throughput, increasing packet delays for all users of the system and/or the like.

While situations that give rise to such behaviors may be difficult to avoid, the resultant behavior can be changed by, e.g., capitalizing on certain properties of a wireless broadcast medium. According to some preferred embodiments, techniques are provided that can help stations that experience poor link quality, to make use of other already available high quality links (such as, e.g., multi-hop links). According to some of the preferred embodiments, a scheme is provided that helps stations with poor link quality to avoid having to transmit at very low rates and/or high packet errors, thus, improving overall system performance considerably.

According to some of the preferred embodiments, a novel re-transmission mechanism is employed that enables faster and more reliable packet delivery. In some preferred implementations, such as system can readily be employed by enhancing an existing 802.11 medium access scheme.

According to some embodiments, a technique is employed that involves re-transmissions by a station other than the original sender, without having to contend for the medium. In this regard, "contention" involves circumstances in which two or more nodes or stations attempt to transmit a message across the same medium (e.g., wireless) at the same time to contend for network use or access. Potential benefits from such a technique can include, but are not limited to, reduced packet delays (e.g., QoS), increased throughput, increased range, increased fairness in throughput for stations that are farther away from the access point (AP), and/or the like.

The preferred embodiments can advantageously enable the assistance of those stations whose link is slow, un-reliable and/or the like, to deliver their packets in a faster and/or more reliable manner. Among other things, the preferred embodiments can, thus, readily lead to system wide benefits including, e.g., higher throughput, reduced delays and increased range and distance.

In the preferred embodiments, a solution can be implemented that actually make use of resources present in existing WLAN systems and does so in a way that conforms to the already existing standards.

Helper Stations

According to some preferred embodiments, a solution is employed wherein a sub-set of stations in a wireless network (referred to herein as HELPER stations) are configured to act similar to relay stations that help to re-transmit the packet(s) originally transmitted from a distant sender station to an access point (AP) or the like, should the original packet transmission fail.

For illustrative purposes, FIG. 1 shows an architectural diagram depicting an illustrative wireless communication system within a building structure according to some illustrative and non-limiting embodiments, which includes a plurality of stations S1-S4 located in or proximate to a structure or building B, such as, e.g., a home, office or other structure. The stations S1-S4 can include, inter alia, wireless devices or nodes, including, e.g., personal computers, lap top computers, personal digital assistants (PDAs), wireless phones, office equipment, entertainment devices, and/or the like. In this illustrative example, at least one access point AP is provided to which the stations S1-S4 seek to communicate wirelessly. In various embodiments, the at least one AP can include, e.g., wireless local area network (WLAN) APs, routers, bridges, gateways and/or other points of access to a wireless network. Typically, an AP will involve a node or station that transmits and receives data (e.g., a transceiver). Typically, an AP will involve a node or station via which stations (e.g., S1-S4) can communicate for, e.g., network access or the like.

As shown in FIG. 1, the system preferably includes at least one HELPER station, such as, e.g., stations H1-H3 shown in the illustrated example. As shown, the HELPER stations can be situated in locations so as to be able to enhance communications within the wireless network as described herein. As with the AP, the HELPER stations preferably are transceivers that can be programmed or configured to perform certain functionality as described herein.

In some embodiments, a sender station S, or even another AP, could be modified so as to concurrently or alternatively operate as a HELPER station H.

However, one should appreciate based on this disclosure that, in the preferred embodiments described herein, the "relay" feature is atypical in that it is used for "re-transmissions." In the preferred embodiments, this technique involves that the HELPER stations process (e.g., decode completely or substantially completely) all packets irrespective of the destination address. Preferably, after the HELPER station successfully decodes the packets, it can re-transmit the packets to the destination, should the initial transmission fail. Among other advantages, the HELPER station (which would generally be located, e.g., significantly closer to the AP than the original sender) can re-transmit the packet at a substantially higher rate and/or substantially more reliably. Furthermore, in the preferred embodiments, the HELPER station does the re-transmission without having to contend for the medium again. Preferably, the HELPER station does the re-transmission within the same integral packet cycle as the original transmission from the sender.

The preferred embodiments, thus, preferably include the following two notable aspects:

a) re-transmission performed by a station other than the original sender; and b) re-transmission performed within the original packet cycle without having to re-contend for the medium.

These latter two aspects differ significantly from existing systems.

As discussed above, there are often at least some stations in a WLAN system or the like that experience slow and/or unreliable links, such as, e.g., due to spatial distribution and/or temporal interference. In such cases, packet losses and delays resulting from such a condition can lead to a reduction of the overall system throughput.

In existing systems, a successful packet decoding at, e.g., an AP is signaled using an acknowledgment transmission (e.g., an ACK transmission) from the AP. Typically, if the original sender of the packet does not receive an ACK transmission within a specified period of time (e.g., an ACK TIMEOUT period), the original sender infers that the transmission was not successful. In such existing systems, for a sender to re-transmit the packet, the sender has to re-contend for the medium (e.g., after the ACK TIMEOUT period) and transmit the packet again at the low-rate, once it re-acquires the medium.

In contrast to the deficiencies of the foregoing existing systems in which the sender re-transmits the packet after contending for the medium, the preferred embodiments of the present invention can advantageously capitalize on the broadcast nature of the wireless medium, where stations other than the intended recipient can receive the packet (and, e.g., can decode the packet correctly depending on their relative positions, etc.) and are in a position to re-transmit the packet faster, more reliably and/or the like (i.e., better than if the original sender attempted to re-transmit the transmission as in existing systems).

In addition, in some embodiments, the sender stations are configured to or adapted to become aware of the presence of HELPER stations. Furthermore, in some embodiments, such sender stations having low-rate transmissions or the like (such as, e.g., due to poor link quality with an AP or the like) can potentially be configured or adapted to transmit at higher rates upon, e.g., becoming aware of the HELPER station(s)—i.e., based on the assumption that such HELPER station(s) (which may, e.g., be closer to the sender than the AP and, hence, have a better link quality with the sender) will cover up if the original transmission fails. Among other things, such an improvement in the "low-rate" stations can directly translate to system-wide throughput improvements.

Illustrative Advantages

As described above, the employment of at least one HELPER station can provide immediate advantages of increasing throughput, reducing delays and improving range. However, such HELPER station systems can also achieve further advantages.

By way of example, it can be seen that in existing systems the 802.11 CSMA/CA MAC layer is fair in terms of giving substantially equal channel access opportunities for stations with varying rates. As discussed above, this fairness of existing systems is disadvantageously ensured at the expense of reducing the overall system throughput. However, typically wireless links are error prone. Often, stations that are farther away from a sender in poor signal strength conditions will experience higher packet errors than the station's nearby. As a result, for existing systems, this often leads to unfairness in the net throughput attained by various stations.

In the preferred embodiments, the presence of HELPER stations which are configured to provide help to the "poorer" stations helps to ensure more fairness across stations in a system, and, at the same time, improves the net throughput.

In some of the preferred embodiments one or more, preferably a plurality or even all, of the following notable advantages can be achieved:

1) Reducing the average time it takes for a packet to be successfully received by, e.g., an AP;
2) Helping to reduce contention in a system;
3) Helping-to-increase the transmission rates of "low-rate" stations;
4) Improving the throughput of "low-rate" stations;
5) Improving the throughput of the overall system;
6) Improving the delay characteristics of "low-rate" users;
7) Improving the delay characteristics of the overall system;
8) Reducing the energy spent per bit for "low-rate" users (e.g., improving their battery life);
9) Potentially reducing the energy spent per bit for "low-rate" users (e.g., improving their battery life);
10) Ensuring increased fairness with respect to achieved throughput; and/or
11) Increasing the range of a wireless system.

First, it should be understood based on this disclosure that in order to achieve various benefits of the preferred embodiments, the underlying system should have some transmission difficulties, such as, e.g., packet errors to address with such a system. Second, it should also be appreciated that the more variation there is in terms of the packet errors between various stations in a wireless network, the more significant the various advantages of the preferred embodiments become. Both these are typical in wireless systems, since in most wireless usage scenarios, stations are distributed randomly across the transmission (e.g., radio) range and, thus, experience varying levels of packet error rate.

Notably, the preferred embodiments have very substantial value realized from the extra benefits obtained through proper utilization of available resources, rather than creating new ones, in an already resource-limited WLAN or the like system. For example, because wireless is a broadcast medium, all stations within transmission (e.g., radio) range can listen to (and can potentially be configured to decode) all packets. And, this inherent advantage can be used to, inter alia, help "poor" stations achieve better system performance.

Performance Results

There are a variety of system parameters (such as, e.g., transmission rates, packet lengths, and link error probabilities) that can help to evaluate the effectiveness of using HELPER station approach. Analyses conducted by the present inventors reveal that the throughput improvement in using HELPER stations can be substantial, even under pessimistic system conditions. These analyses demonstrated that the net gain in throughput can vary, e.g., between about 7% and 425%, in cases where it is beneficial to use HELPER stations. To give further insight into the factors that affect the net gain, the following simplified scenarios are presented. In the analysis, a simplified assumption was utilized that usable throughput (termed "goodput") is determined by: G=T(1-per). Here, G denotes the goodput, T denotes the MAC layer throughput (e.g., error free link), and per is the link probability of packet error. Here, reasonable values for per were assumed, for each scenario, wherein the transmission rates are proportional to the corresponding packet error rate.

1) Low Speed Reliable Link

In an illustrative example, we assume a 500 byte packet that needs to be transmitted from a first station (i.e., the sender) to, e.g., an AP. In a normal system, we assume that the sender can transmit the packet at the rate of 1 Mbps, and that the AP can decode the packets with a per=0.01. Now, we assume the presence of a HELPER station (for example, at a desirable location in between the sender and AP), which can transmit a packet to the AP at a rate of 11 Mbps, with a per=0.01. In this context, there are several scenarios (e.g., each of which is based on a later rate at which the sender transmits the packet). If the sender is unaware of the presence of the HELPER, the sender still transmits at the rate of 1 Mbps. In a more likely case, however, if the sender is aware of the HELPER, it can increase its transmission rate (e.g., to 2 Mbps, 5.5 Mbps or 11 Mbps). Although this increase will increase the per at the AP (from 0.01), the sender can take the risk since it knows the HELPER will assist in re-transmitting any lost packet(s). An illustrative improvement in 'goodput' as compared to s case where there is no HELPER station, is given below, for different transmit rates:

| a. | 1 Mbps: | 0.4% |
| b. | 2 Mbps | 70% |
| c. | 5.5 Mbps | 192% |
| d. | 11 Mbps | 241% |

From the foregoing, it can be readily observed that a HELPER station is able to improve the throughput of a station with a low speed reliable link (e.g., 1 Mbps, 0.01 per) substantially when the station realizes (e.g., is aware of) the presence of HELPER and increases it's transmit rate. Nevertheless, even when the sender station continues to transmit at 1 Mbps, there can still be some advantages in having HELPER stations; however, in some circumstances, the advantages may not be worth the effort.

2) High Speed Un-Reliable Link

In an illustrative example, we assume a 500 byte packet that needs to be transmitted from sender station to, e.g., an AP. Further, we assume that the normal system can transmit at a rate of 2 Mbps, but with a highly error prone link to the AP: per=0.25. As before, the HELPER can transmit to the AP at a rate of 11 Mbps and per=0.01. The sender, based on whether it is aware of the presence of HELPER or not, can transmit at different rates (with different per's at the AP), to achieve different 'goodput' gains as given below:

| a. | 2 Mbps | 3% |
| b. | 5.5 Mbps | 70% |
| c. | 11 Mbps | 109% |

As before, it can be seen that the HELPER station can result in substantial 'goodput' gain, given that the sender is aware of its presence.

It should be appreciated that the above scenarios are merely illustrative and that there are numerous other representative scenarios that may be considered to show the advantageous effects that a HELPER system can have, but the scenarios outlined above are helpful to demonstrate the advantageous effects that HELPER stations can have.

In other examples, the huge gains realizable when a HELPER station helps a sender with a low speed and un-reliable link (1 Mbps, 0.25 per) to transmit a 1500 byte packet can be, e.g., between 16% (1 Mbps) and 430% (11 Mbps).

In preferred embodiments, only stations with low speed and/or un-reliable links need to be helped. The analyses used to obtain the results above are based on a single user present in the system. However, it is noted that with the presence of a HELPER system, the contention in the medium reduces, and, thus, the HELPER system can result in a gain in 'goodput' even for high speed or reliable links.

Illustrative HELPER Station Implementations

This section describes some illustrative preferred embodiments and describes some illustrative changes that can be employed within current systems to implement a HELPER station system and method. As discussed above, in some preferred embodiments, there are two notable aspects in which a HELPER station differs from a normal WLAN station:

1) The ability to determine if a particular received packet requires HELP (e.g., a unicast packet not addressed to itself, and based on the transmission rates whether there is need to help, etc), and to mark it accordingly so that appropriate processing can be performed.

2) The ability to judge the absence of an acknowledgement signal (e.g., ACK), and to begin re-transmission when the absence of ACK is confirmed.

In existing systems, a station after receiving the PHY layer packet, will first check for the CRC (e.g., cyclic redundancy check) to determine if it is in error. If the CRC check is successful, the receiver decodes the destination MAC address from the packet. In existing systems, if the destination MAC address does not match its own MAC address, the packet is not processed further. In addition, in such a case, in existing systems, the station will set its own NAV vector to indicate virtual medium busy based on the 'duration' field in the packet header.

On the other hand, in the preferred embodiments of the present invention, there are some notable differences from existing systems. First, a HELPER system preferably processes some or all (e.g., some based on source MAC address, destination address type, etc.) received packets, irrespective of whether the packets destination address matches its own MAC address. This processing preferably includes, e.g., the demodulation and the separation of the data part from rest of the packet.

Second, the HELPER system preferably ignores the 'duration' field in the received packets that are determined to need to be HELPED. This allows the HELPER to not update the NAV vector. Accordingly, the virtual carrier sense will indicate medium idle. This, in turn, will ensure that the HELPER system listens to the medium for a fixed time duration that is enough to ensure the presence/absence of the ACK signal from the recipient (e.g., an AP), from the time of reception of the packet.

If the original recipient was able to receive the packet successfully, it will send an ACK signal after a first time duration (e.g., a SIFS [short interframe space] time duration). Thus, if the HELPER station finds the medium busy within a second time duration (e.g., a 2*SIFS time duration), it preferably determines that the original recipient has received the packet. Then, the HELPER preferably drops the decoded packet and continues with a normal mode of operation. If on the other hand, the HELPER finds the medium to be free beyond the second time duration (e.g., the 2*SIFS time duration) after the packet transmission, it determines that the original recipient has not received the packet, and the helper re-transmits the packet to the original recipient's destination.

It should be noted that since the re-transmission attempt by the HELPER can use a different transmit rate (higher), the MPDU (e.g., MAC protocol data unit) will differ from the MPDU corresponding to the original received packet. The HELPER preferably makes sure that the source address in the re-transmitted packet is the same as the source address from the original packet (and not, e.g., that of the HELPER system), so that the final recipient will transmit the ACK signal to the original sender.

Illustrative General Steps

Figure 2A:
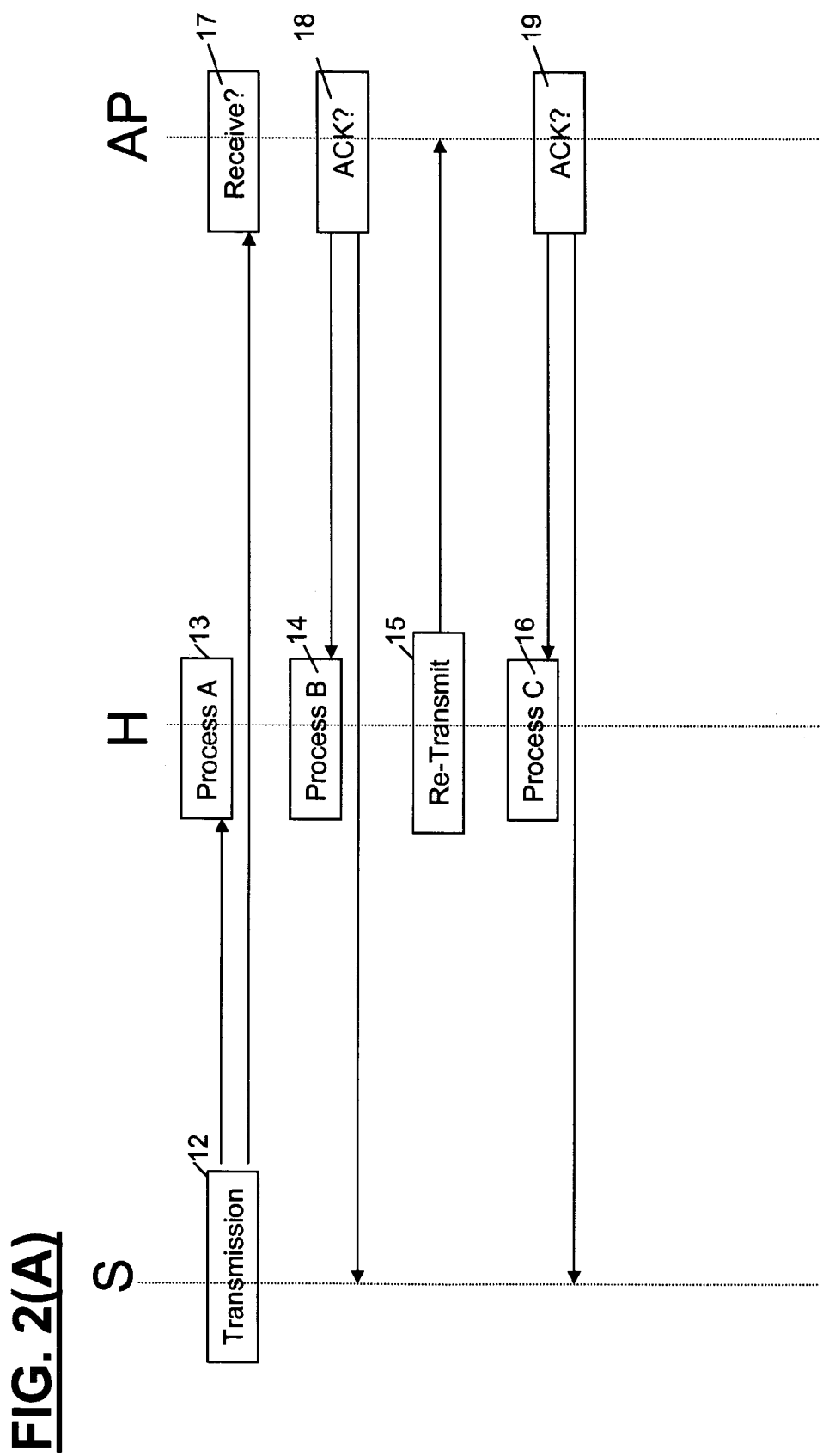
FIG. 2(A) is a schematic diagram showing some illustrative communication and process steps according to some illustrative embodiments.
Figure 2B:
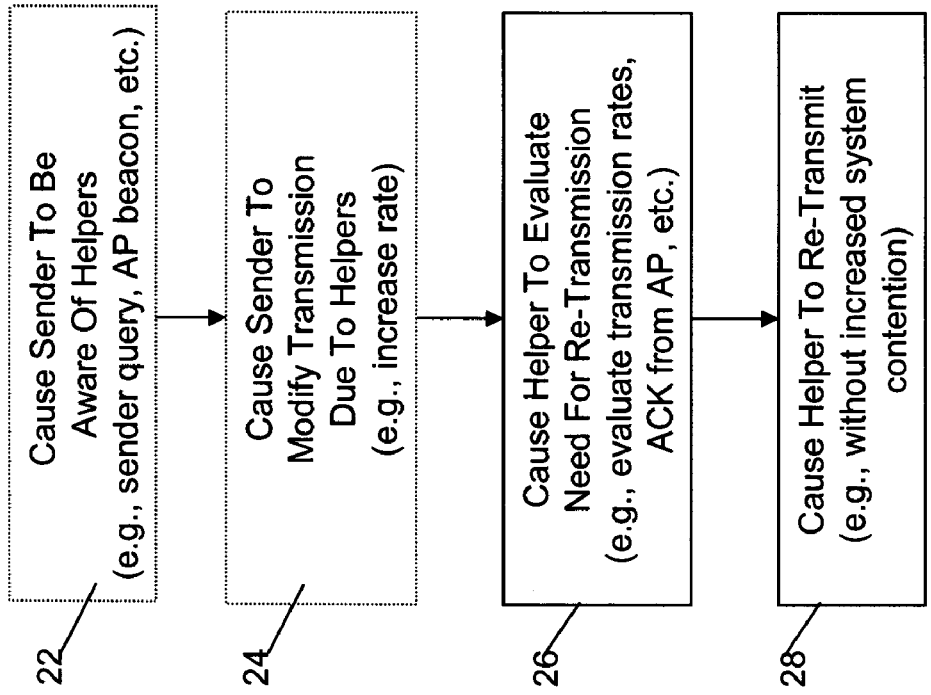
FIG. 2(B) is a flow diagram showing illustrative process steps according to some illustrative embodiments.

FIGS. 2(A)-2(B) show some illustrative high-level general steps according to some illustrative embodiments of the invention.

With reference to FIG. 2(A), this figure is a schematic diagram showing some illustrative communication and process steps according to some illustrative embodiments. This diagram helps to demonstrate some of the high-level steps in some preferred embodiments. As shown, a sender station S initially transmits an original transmission at step 12 that is received by a helper station H at 13 and, possibly, an AP at 17. Next, the AP either sends an acknowledgement signal (e.g., ACK) at 18, or, e.g., does not acknowledge receipt of the original transmission. As shown at 15, if the helper stations H determines that the AP did not receive the original transmission, the helper station H re-transmits the original transmission to the AP. As shown at 19, upon receipt of the transmission from the helper H, the AP can then transmit it s acknowledgement signal (ACK) back to the sender station S (and the helper H).

With reference to FIG. 2(B), this figure is a flow diagram showing illustrative general process steps according to some illustrative embodiments. As shown in FIG. 2(B), in some embodiments, at a first optional step 22, the sender station S is caused to become aware of the presence of at least one helper H. This can be done in a variety of ways, such as, e.g., by manually programming such information into the sender, by establishing a communication between the sender and the helper or the like, by having the sender send a polling query to the network components, by having an AP transmit a beacon containing this information and/or by other means. As shown in FIG. 2(B), in some embodiments, at a second optional step 24, the sender is caused to modify its transmission due to the presence of the helper H discovered in step 22. As depicted in dotted lines in FIG. 2(B), steps 22 and 24 can be optional steps that can be performed in some embodiments of the invention, but that can be omitted in other embodiments.

As shown at step 26 in FIG. 2(B), the helper H preferably is configured to render an evaluation of the need for re-transmission, such as, e.g., by evaluating transmission rates, determining if an acknowledgement signal is received from an AP and/or the like. Then, at step 28, the helper H, upon a determination that re-transmission is needed, can re-transmit the original signal in such a manner as to avoid re-contention for the system.

In some illustrative embodiments, the HELPER station is more particularly configured to perform the following steps.

1) HELPER station receives packets and determines whether the packet needs help. The decision at this stage can be, e.g., largely based on whether the packet is a unicast packet not addressed to itself.

2) Upon deciding to help a particular packet, the receiver sends the packet after marking accordingly, so that higher blocks can do appropriate processing. Preferably, the 'duration' field in the packet is ignored and NAV vector is not updated.

3) The LLC layer (i.e., the logical link control layer sub-layer of the data-link layer) upon receiving a packet marked to be HELPED can determine further if the packet needs to be really HELPED. For example, the LLC layer can examine the source address of the packet and also the rate at which it can transmit the packet to the final destination before making a final decision on whether the packet should be HELPED.

4) Upon decision by the LLC layer to help a packet, the packet is placed in the transmit buffer and an appropriate signal is issued to the lower blocks to transmit the HELPED packet.

5) The transmit block upon receiving the signal to transmit a HELPED packet waits for a time period (e.g., of 2*SIFS) for any medium activity. If the medium is found idle for the whole time period, the station transmits the HELPED packet. If on the other hand, any activity was found while waiting for the 2*SIFS period, the station cancels the transmission of the HELPED packet.

Illustrative Implementation Details

In some embodiments, systems incorporating HELPER stations can be incorporated into 802.11 environments. In such exemplary embodiments, the changes to be incorporated can be explained in terms of the changes in the 802.11 state machines. The following description, in conjunction with FIGS. 3-6, outlines the state machines where certain notable changes are implemented in order to support an illustrative HELPER system. It should be appreciated by those in the art that, based on circumstances, various other changes and modifications can be employed as appropriate. In FIGS. 3-6, the darkened/shaded blocks depict aspects in which new functionality is added to existing functionality, while the non-darkened/non-shaded blocks generally depict existing functionality.

In the exemplary environment of 802.11, four 802.11 MAC state machines (i.e., blocks) are to be modified. These four blocks are:

1) Receiver block (Filter-MPDU): This block filters valid received frames by destination address. Here, a need for acknowledgement signal and duration ID updating messages are sent out.

2) LLC block: This block accepts packets from MAC layer and passes on to higher layers. Accepts messages from higher layers and gives to MAC layer for transmission.

3) Transmitter block (Transmit Co-ordination): This block is an involved block which performs most of the DCF functionality, including waiting for SIFS/DIFS/EIFS duration (i.e., short interframe space/distributed coordination function interframe space/extended interframe space) and initiating back-off procedure at the end of it.

4) Transmit block (Data Pump): This block sends an MPDU to the PHY while generating and appending the FCS. This block is also responsible for reporting medium status to the back-off procedure block.

Figure 3:
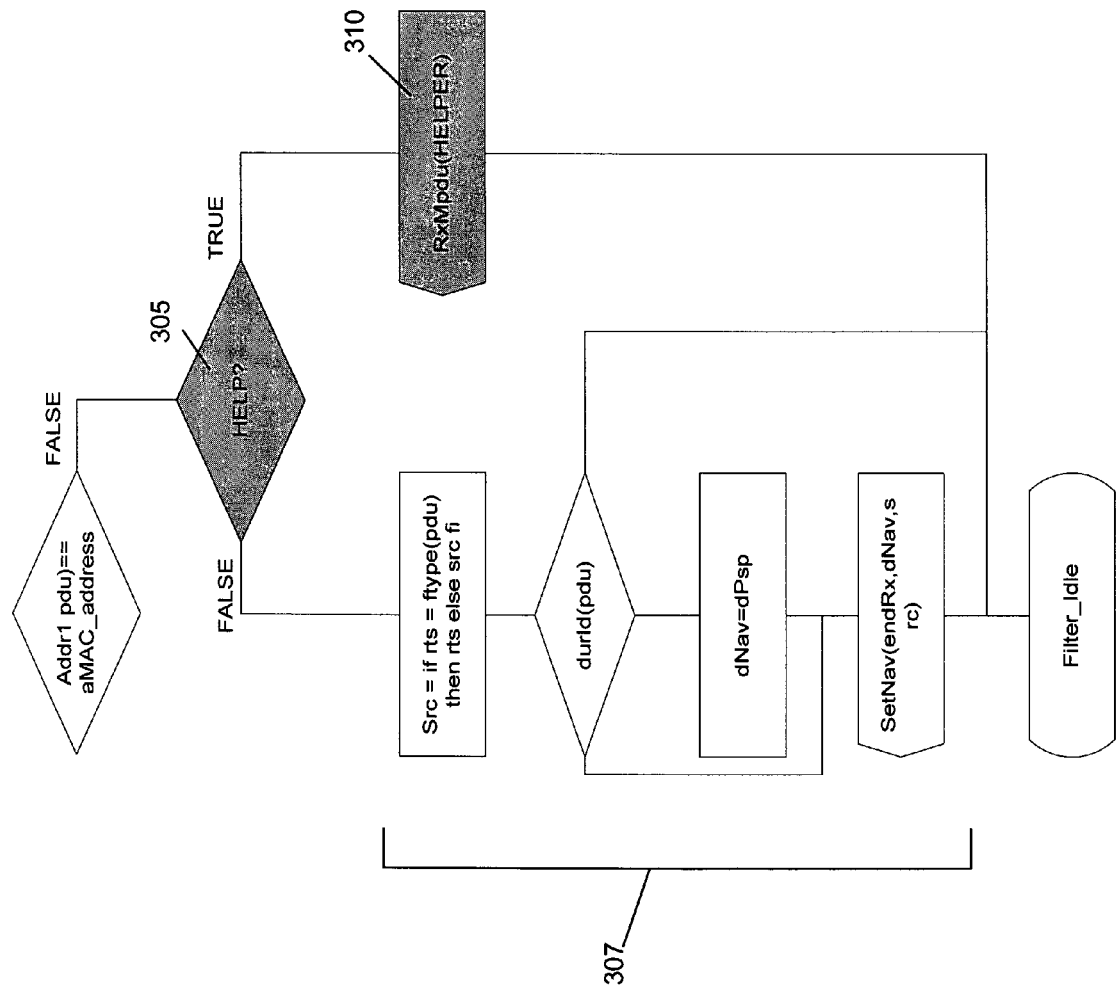
FIG. 3 is an illustrative flow diagram demonstrating illustrative steps that may be carried out related to, e.g., the reception of original packets: Filter_MPDU block.

FIG. 3 demonstrates illustrative processing involved in the reception block called 'Filter_MPDU'. In this block, preferably after determining that the received packet's destination address does NOT match the station's MAC address, the decision block named 'HELP' determines at step 305 if the received packet need to be HELPED. This can be based, e.g., on the source address or other information. If the received packet is NOT to be HELPED (i.e., a FALSE determination as illustrated), it goes through the normal processing steps shown generally at 307 of setting the NAV vector as shown in FIG. 3. However, if the packet is to be HELPED (i.e., a TRUE determination as illustrated), then the signal to inform receipt of packet (RxMPDU) will be modified appropriately to indicate that the packet is being HELPED at step 310. For example, this can be in the form of an extra field. Note that, as shown in FIG. 3, the NAV vector is not being set in this case.

Figure 4:
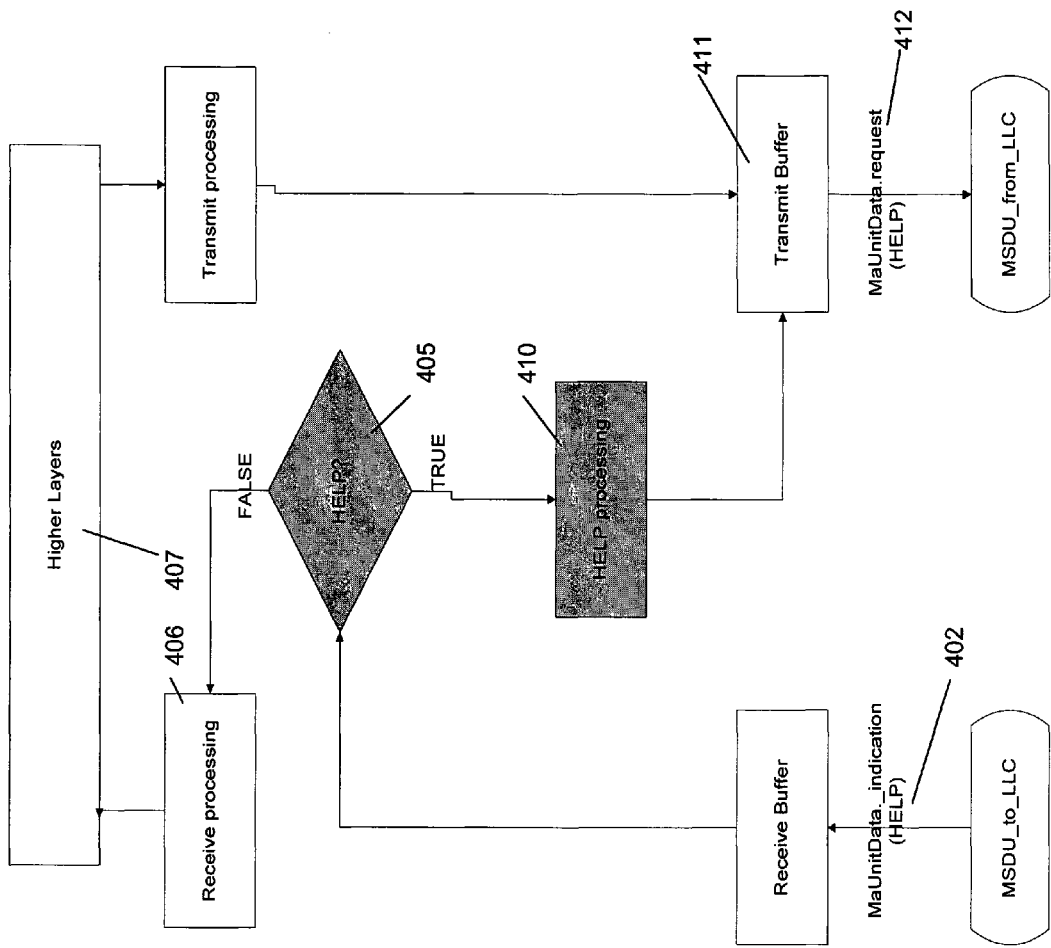
FIG. 4 is an illustrative flow diagram demonstrating illustrative steps that may be carried out related to, e.g., packet handling at the LLC layer.

FIG. 4 denotes illustrative processing involved in the block for packet handling at the LLC layer. Here, the RxMPDU message (discussed above) from the receiver will arrive at the LLC as MaUnitData._Indication message see step 402. Upon checking this message, the HELPER decision block at step 405 will determine if the packet needs to be HELPED. If it is a normal received packet which does not need HELP (i.e., a FALSE determination as illustrated), it will go through normal receiver processing at step 406 (Receive Processing) and then to higher layers at 407. However if the packet needs HELP (i.e., a TRUE determination as illustrated), it will pass through a HELP processing block shown at step 410 before being put in the Transmit buffer shown at 411 as the next packet to be transmitted, and generating the transmit request message MaUnitData.request as shown at 412. The HELP processing block at 410 will make sure that the source address parameter for the outgoing MaUnitData.request message is the same as the one present in the incoming MaUnitData._indication message. Normally, the source address in MaUnitData.request message is the station's own MAC address. Note that an extra field (HELP) is added to the messages to support the new functionality.

Figure 5:
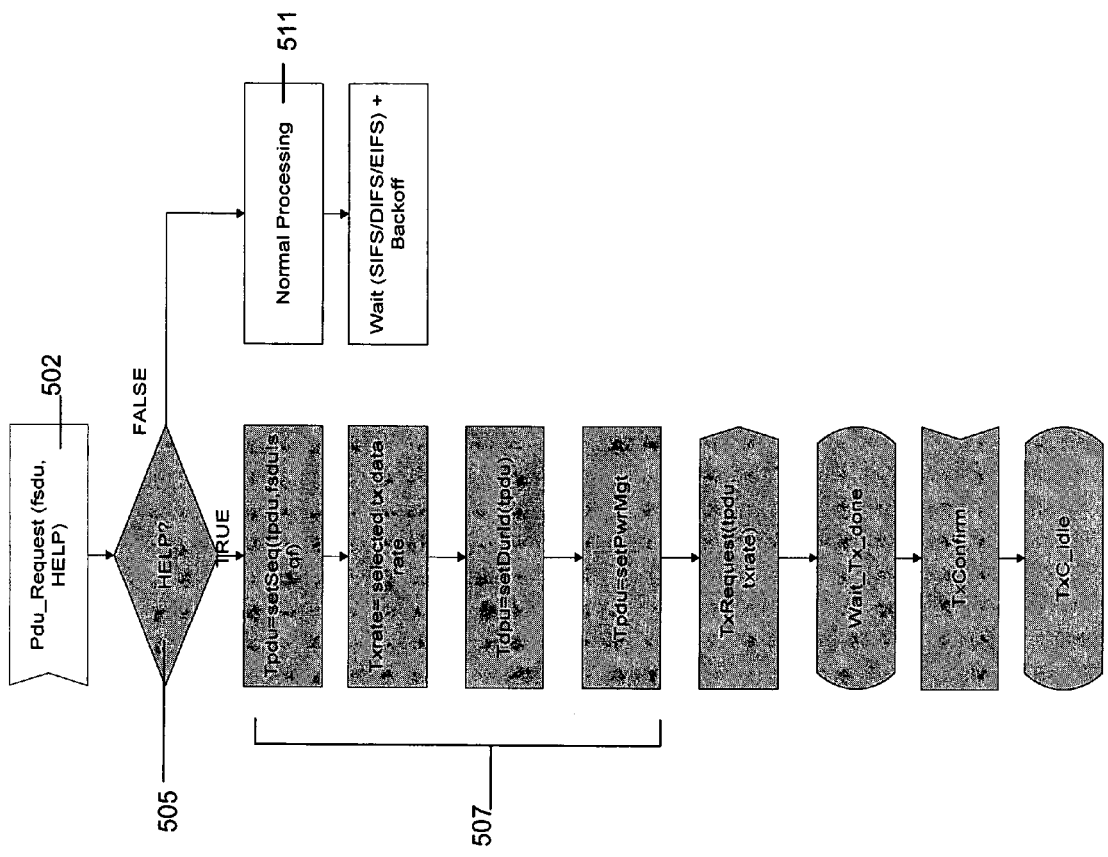
FIG. 5 is an illustrative flow diagram demonstrating illustrative steps that may be carried out related to, e.g., transmission of a HELP packet: transmit co-ordination.

FIG. 5 shows an illustrative transmit coordinator which receives the MaUnitData.request message (e.g., in the form of a Pdu_Request) at 502 and determines whether the current packet is to be HELPED or not at 505. If it is to be HELPED (i.e., a TRUE determination as illustrated), after setting the various parameters like transmit rate, transmit power, duration ID, sequence number, etc., as depicted in, e.g., steps shown generally at 507, the transmit request is sent further down the transmitter without doing any additional wait or random backoff, like for a normal packet. On the other hand, if it is not to be HELPED (i.e., a FALSE determination as illustrated), then, as shown in FIG. 5, it continues on to normal processing at 511.

Figure 6:
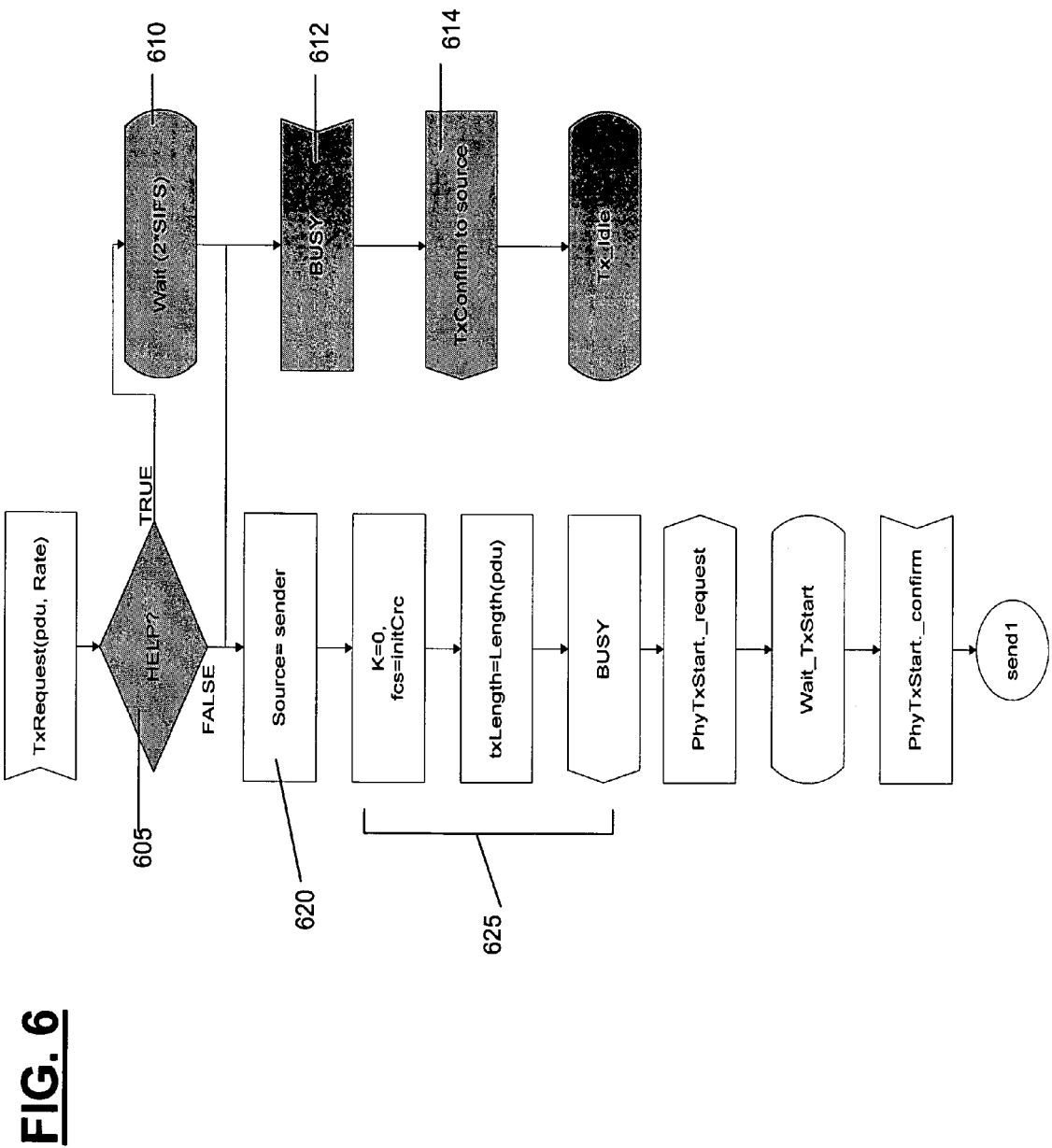
FIG. 6 is an illustrative flow diagram demonstrating illustrative steps that may be carried out related to, e.g., transmission of a HELP packet: process data pump.

FIG. 6 shows a notable part of the transmitter (e.g., process data pump), which helps in transmitting the HELP packet after determining that the medium is free for 2*SIFS duration. If the current packet to be transmitted needs HELP (as determined by the HELP decision block at 605), the data pump monitors the medium for 2*SIFS period as shown at 610. During this period, if it receives a BUSY signal from a Channel-State block at 612, the assumption is that the packet was successfully received at the destination, and the current BUSY status is due to the ACK from the destination. In this event, there is no further need to transmit the HELP packet, thus the process data pump sends a TxConfirm message to the higher blocks at 614, which indicates the end of the transmission process (e.g., this time without really transmitting the packet). In case the medium was found not BUSY for 2*SIFS duration, the station determines that the destination failed to decode the original packet correctly and it is time to re-transmit the packet, such as, e.g., at 620. Thus, the HELP packet goes through the normal pre-transmittion processing steps shown generally at 625 and finally issues the PhyTxStart._request to the PHY layer as shown in FIG. 6.

Additional Aspects of Some Preferred Embodiments

This section details some aspects in the usage of HELPER systems that can be helpful for, inter alia, performance optimization and/or the like.

1. Helper System Configurations

In some embodiments, HELPER stations can be envisioned to play different roles in a wireless LAN system, each one requiring it's on set of rules for the relationship between HELPERS and other stations, and creating different levels of performance enhancement. A few illustrative possibilities are discussed below:

a. Invisible HELPERS

In some embodiments, the stations in a WLAN system (e.g., various senders and/or the like) are not aware of the presence of HELPER stations. In this disclosure, this is, by analogy, referred as having the HELPER stations being in an invisible mode and doing the re-transmissions whenever the original packet transmissions fail. As described above, the gains of using a HELPER system may be limited if the stations continue to transmit at the same rate as previously transmitted, even in the presence of HELPER stations. However, gains can still be achieved, even with the same rates, and such a system requires no or substantially no overhead/information beyond that of a normal WLAN system.

b. Range Extender HELPERS

In some embodiments, a discussed above, the range of WLANs (especially, the ones operating in, by way of example, the 5-GHz band) is severely limited if one considers a usage scenario like a multi-floor home (such as, e.g., similar to the illustrative example shown in FIG. 1), where there is typically only one AP to cover all of the floors. In such illustrative cases, HELPER stations can be very helpful to extend the range of the AP. For these cases, the assorted sender stations (such as, e.g., various home entertainment devices, personal computers, servers, laptops, PDAs, transceivers, other nodes, other devices, etc.) are preferably made aware of the presence of the HELPERS. Then, the stations can transmit their packets at high enough rates so as to be decoded by the nearest HELPER and not by an AP (e.g., in another floor). The HELPER can then re-transmit the packets to the AP (e.g., as and when the AP fails to decode the original packet).

As explained above, the use of HELPERS in the place of "repeaters" provides a very attractive solution, since, among other things, "repeaters" need to re-contend for the channel before relaying the packet to the AP, whereas HELPERS can do so in the same packet cycle.

c. Buddy Helpers

In some embodiments, a system is provided which banks on the assumption that the stations in a WLAN system are aware of the presence of HELPERS. In some embodiments, the stations can then transmit at rates higher than normal, under the assumption that the HELPER system will cover up if the original transmission fails. However, in various embodiments, the amount of knowledge that the sender stations may have regarding HELPERS can vary. Similarly, the performance achieved by the HELPER system can also vary. In some ideal scenarios, the stations themselves can decide whether it is desirable to go through a HELPER (e.g., at a higher rate, as opposed to the low rate to the AP), and correspondingly to transmit using the highest possible rates to achieve maximum performance gains.

There are a number of means for having the sender stations made aware of the HELPERS. For example, it is feasible for the AP to let the stations know about the presence and location of HELPERS through beacon packets. In summary, in various embodiments, the configuration is a tradeoff between the amount of information regarding HELPERS that needs to be disseminated and the performance gain that can be achieved.

Coordination of HELPER Stations: Avoiding Too Much Help

In some of the preferred embodiments, some of the gains in using the proposed HELPER system come from the contention-less way in which a HELPER preferably re-transmits the packet. However, avoiding contention can potentially bring its own set of problems. For example, it may be possible that multiple HELPER stations may receive the same packet and independently determine at the end of 2*SIFS period to re-transmit the packet, resulting in multiple transmissions colliding, and potentially making the problem worse.

To address this problem, a number of techniques may be employed. For example, either there should be an understanding that only one of the HELPER stations will re-transmit. For example, this can potentially be done if there is a pre-determined many-to-one mapping of stations being helped and corresponding HELPERS. However, this requirement may take away some of the 'link-diversity' that is one of the very desirable features of a HELPER system according to some embodiments.

Another solution is to introduce a random back-off at the end of the wait period (2*SIFS). However, a goal here is preferably to make the back-off period large enough to reduce the collision probability to a small level while concurrently keeping it small enough not to reduce the overall gain in the total packet cycle time. In some embodiments, HELPERS can choose the parameters of back-off if they have sufficient knowledge about the presence of other HELPERS.

Illustrative Applications of the Preferred Embodiments

The following list sets forth a few illustrative usage scenarios demonstrating how a HELPER system can make today's systems better. As with various descriptions and examples in this disclosure, this list is merely illustrative, non-limiting and non-exhaustive.

1) In some illustrative examples, HELPER stations are sprinkled (e.g., distributed around locations) near to the AP in a typical hotspot usage scenario. In this case, the HELPERS preferably assist stations that are far away from the AP to re-transmit their lost packets. In such embodiments, stations may not need to necessarily be aware of the presence of HELPERS.

2) In some illustrative embodiments, HELPER stations are present in an office environment with mixed data and/or voice users. In some embodiments, since this is a more controlled environment, it may be feasible for the stations to know about the presence and location of the HELPERS. In some embodiments, data users can increase their transmission rate and can get better overall throughput. On the other hand, in some embodiments, voice users can experience lesser packet delays and can improve the overall system capacity.

3) In some illustrative embodiments, the HELPER stations present in a multi-floor home or office environment can function as reach extenders and can help to serve, e.g., a larger area, such as, e.g., an entire home with less APs.

In general, as described herein, the preferred embodiments can advantageously leverage the untapped broadcast advantage present in WLAN systems to help stations with poor link quality to achieve higher rates, lesser packet delays, enhanced overall system performance and/or various other benefits.

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A helper station system for enhancing communications in a wireless network having at least one slow or unreliable link, comprising:

at least one helper station configured to determine the presence of the at least one slow or unreliable link and to wirelessly re-transmit an original wireless transmission from at least one sender station to at least one access point without having to re-contend for access to the wireless medium by processing the original wireless transmission at the at least one helper station;

said at least one helper station being configured to receive and decode data packets of said original wireless transmission irrespective of destination addresses of the data packets and to re-transmit the data packets within a same packet cycle of the original transmission without re-contending for access over the wireless medium upon determining the presence of the at least one slow or unreliable link causing the original wireless transmission to fail.

2. The system of claim 1, wherein said at least one helper station is configured to re-transmit said original transmission at a faster rate than said at least one sender station.

3. The system of claim 1, wherein said wireless network includes a WLAN.

4. The system of claim 1, wherein said wireless network includes an 802.11 network architecture.

5. The system of claim 1, wherein said at least one sender station is configured to become aware of the presence of said at least one helper station and to increase its transmission rate based on such awareness.

6. The system of claim 1, wherein said at least one helper station is configured to determine if said original transmission received from said at least once sender station requires help.

7. The system of claim 1, wherein said at least one helper station is configured to effect re-transmission in the absence of an acknowledgement signal from the access point within a certain time period.

8. The system of claim 1, wherein said at least one helper station is configured to process received packets of said original transmission, irrespective of whether destination addresses of said received packets match its own MAC address.

9. The system of claim 1, wherein said at least one helper station is configured to ignore a duration field in received packets of said original transmission and to not update a NAV vector.

10. A helper station system for enhancing communications in a wireless network having at least one slow or unreliable link, comprising:

at least one helper station configured to determine the presence of the at least one slow or unreliable link and to wirelessly re-transmit an original wireless transmission from at least one sender station to at least one access point without having to re-contend for access to the wireless medium by processing the original wireless transmission at the at least one helper station;

wherein said at least one helper station is configured to determine if the access point has not received the original transmission, and is configured such that if the helper station determines that the access point has received the original transmission, the helper station drops the original transmission, and such that if the helper station determines that the access point has not received the original transmission, the helper station re-transmits the original transmission to the access point.

11. The system of claim 10, wherein the helper station is configured such that if the helper station determines that the access point has not received the original transmission, the helper station re-transmits the original transmission to the access point after the helper station decodes the original transmission.

12. The system of claim 10, wherein the helper station is configured such that if the helper station determines that the access point has not received the original transmission, the helper station re-transmits the original transmission while maintaining the MAC address the same as that of the original transmission.

13. A method for enhancing communications in a wireless network having at least one slow or unreliable link, comprising:

a) transmitting an original transmission from at least one sender station to at least one access point at a first transmission rate; and b) receiving said original transmission at least one helper station configured to re-transmit said first transmission to said access point at a second transmission rate that is substantially faster than said first transmission rate without having to re-contend for access over the wireless medium by processing the original transmission at the at least one helper station upon detection of the presence of the at least one slow or unreliable link;

said at least one helper station being configured to receive and decode data packets of said original transmission irrespective of destination addresses of the data packets and to re-transmit the data packets within an original packet cycle without re-contending for access over the wireless medium upon the detection of the presence of the at least one slow or unreliable link causing the original transmission to fail.

14. The method of claim 13, further including causing said sender station to be aware of the presence of said at least one helper station and increasing the sender station's transmission rate based on such awareness.

15. The method of claim 13, further including having said helper station determine if said original transmission received from said at least one sender station requires help.

16. The method of claim 13, further including having said helper station effect re-transmission in the absence of an acknowledgement signal from the access point within a certain time period.

17. A method for enhancing communications in a wireless network having at least one slow or unreliable link, comprising:
   a) transmitting an original transmission from at least one sender station to at least one access point at a first transmission rate; and
   b) receiving said original transmission at least one helper station configured to re-transmit said first transmission to said access point at a second transmission rate that is substantially faster than said first transmission rate without having to re-contend for access over the wireless medium by processing the original transmission at the at least one helper station upon detection of the presence of the at least one slow or unreliable link;
   further including having said at least one helper station determine if the access point has not received the original transmission, and if the helper station determines that the access point has received the original transmission, having the helper station drop the transmission, and if the helper station determines that the access point has not received the original transmission, having the helper station re-transmit the original transmission to the access point.

18. A system for enhancing communications in a wireless network having at least one slow or unreliable link, comprising:
   a) a sender station configured to send a transmission to an access point on a wireless network;
   b) said sender station being configured to be aware of the presence of a helper station that is configured to re-transmit an original transmission from said sender station to at least one access point without having to contend for access over a wireless medium, wherein the helper station processes the original transmission prior to delivery to the access point; and
   c) said sender station being configured to increase its rate of transmission to said access point based on being aware of the presence of the helper station and in reliance on said helper station due to the at least one slow or unreliable link.

19. The system of claim 18, further including at least one helper station that is configured to re-transmit the original transmission without having to re-contend for access to the wireless medium.

\* \* \* \* \*

UNITED STATES PATENT AND TRADEMARK OFFICE
CERTIFICATE OF CORRECTION

| | |
|---|---|
| PATENT NO. | : 7,843,867 B2 |
| APPLICATION NO. | : 11/347827 |
| DATED | : November 30, 2010 |
| INVENTOR(S) | : Gopalakrishnan et al. |

It is certified that error appears in the above-identified patent and that said Letters Patent is hereby corrected as shown below:

In the Specification

In Column 7, Line 67, delete "block." and insert -- block; --, therefor.

In Column 12, Line 18, delete "1 Mbps:" and insert -- 1 Mbps --, therefor.

In Column 16, Line 50, delete "pre-transmittion" and insert -- pre-transmission --, therefor.

In the Claims

In Column 20, Line 44, in Claim 13, delete "at least" and insert -- at at least --, therefor.

In Column 21, Line 12, in Claim 17, delete "at least" and insert -- at at least --, therefor.

Signed and Sealed this
Twenty-first Day of October, 2014

Michelle K. Lee
*Deputy Director of the United States Patent and Trademark Office*